June 18, 1940.  J. S. MILLER ET AL  2,204,809
METHOD AND MEANS FOR USE IN DENTISTRY
Filed March 1, 1937  2 Sheets-Sheet 1
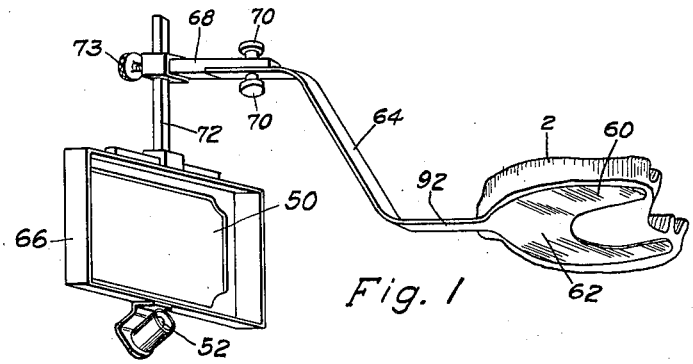
Fig. 1
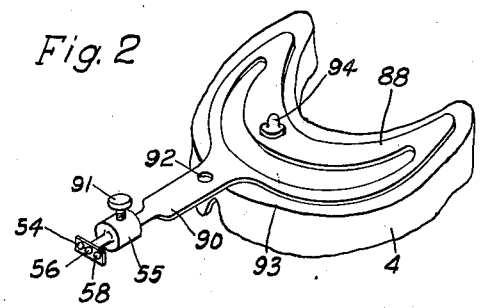
Fig. 2
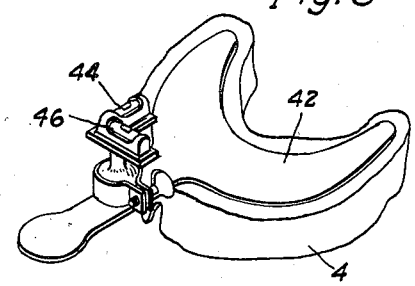
Fig. 3
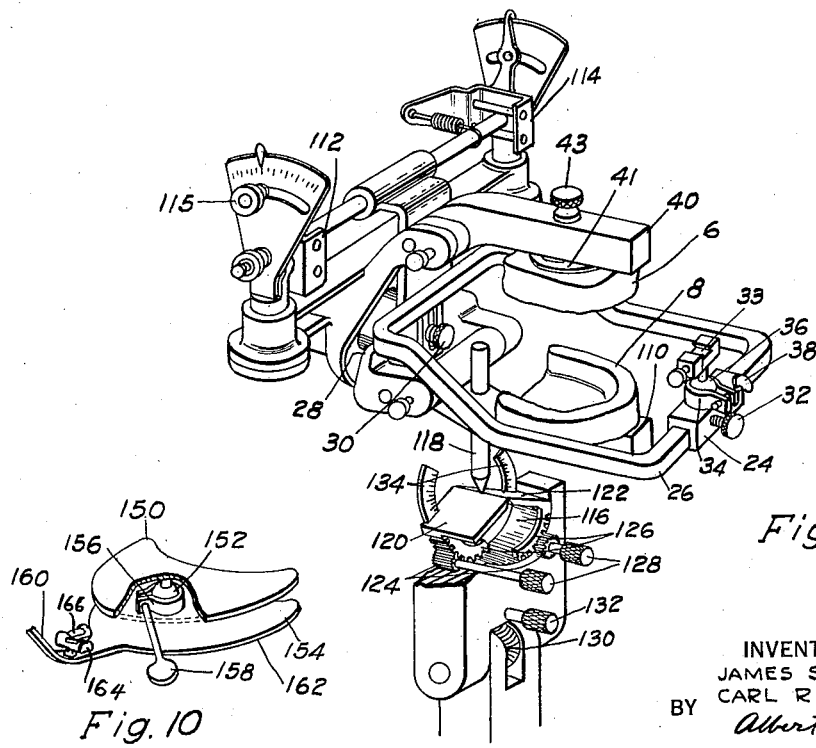
Fig. 5
Fig. 10
INVENTORS
JAMES S. MILLER
CARL R. WALLER
BY Albert Sperry
ATTORNEY June 18, 1940.  J. S. MILLER ET AL  2,204,809
METHOD AND MEANS FOR USE IN DENTISTRY
Filed March 1, 1937   2 Sheets-Sheet 2

INVENTORS
JAMES S. MILLER
CARL R. WALLER
BY Albert Sperry
ATTORNEY.

Patented June 18, 1940

2,204,809

UNITED STATES PATENT OFFICE 2,204,809

METHOD AND MEANS FOR USE IN DENTISTRY

James S. Miller and Carl Richard Waller, Trenton, N. J.; said Miller assignor to Helene Sylvia Miller, Trenton, N. J.

Application March 1, 1937, Serial No. 128,503

8 Claims. (Cl. 32—32)

Our invention relates to the production of artificial dentures and particularly to methods and means whereby artificial dentures may be constructed to faithfully reproduce natural conditions for satisfactory mastication.

In our copending application Serial No. 713,790 filed March 3, 1934 now Patent #2,119,823 issued June 7, 1938, methods and means for producing artificial dentures are disclosed in which records of mandibulary movement may be obtained without physical contact between the patient and the record producing means.

In accordance with the present invention accurate records of a similar nature are obtained for use in producing artificial dentures by means of elements carried by bite plates or other supporting means positioned in the patient's mouth and these records are used in producing dentures.

One of the objects of the present invention is to provide simple and accurate means for producing artificial dentures which correspond faithfully to the natural conditions for mastication.

Another object of our invention is to provide means carried by bite plates or other supports in a patient's mouth for producing an accurate record of mandibular movement.

A further object of our invention is to produce a record by which may be determined the characteristics of the cusps which when used in an artificial denture will insure satisfactory mastication.

Other objects of our invention are to produce artificial dentures which are so related to the patient's mandibular movement as to cause the dentures to have balanced occlusal movement and to produce dentures by which the pressure exerted on the tissues engaged is distributed substantially uniformly throughout lateral and protrusive movements of the mandible.

These and other objects and features of our invention will appear from the following description thereof, in which reference is made to the accompanying figures of the drawings wherein we have shown typical means adapted for use in the practice of our invention. However, it will be understood that any other suitable means than those herein shown and described may be used in the practice of our invention.

In the drawings:

Fig. 1 is a perspective of a typical form of member carrying a screen and adapted for use in the practice of our invention.

Fig. 2 is a perspective of a typical element carrying a mirror and adapted for use with the construction illustrated in Fig. 1 in producing records in accordance with our invention.

Fig. 3 is a perspective of one suitable form of element used in the transfer of a model in accordance with our invention.

Fig. 5 is a perspective of a typical form of articulator adapted for use in the practice of our invention.

Fig. 10 is a front elevation of an alternative element adapted for use in the practice of our invention.

In that form of our invention chosen for the purpose of illustrating a typical embodiment thereof an upper bite plate 2 and a lower bite plate 4 are formed by molding plastic material about plaster models 6 and 8 respectively of the upper and lower surfaces to be engaged by the dentures. The models may be made in any suitable way and positioned in a suitable form of articulator capable of adjustment to reproduce the patient's mandibular movement. A preferred form of articulator which may be used is shown and described in our copending application Serial No. 36,619, filed August 17, 1935 now Patent #2,119,824 issued June 7, 1938.

Figure 4:
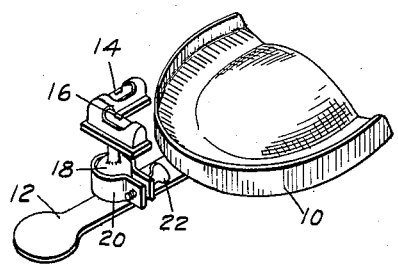
Fig. 4 is a perspective of a novel type of tray adapted for use in obtaining an impression and for positioning models in accordance with our invention.

The models may be made and positioned in various ways. For example, a model of the upper surface to be engaged by the denture may be made by applying plastic material to a tray 10 (shown in Fig. 4) having a handle 12. The plastic material carried by the tray is pressed against the upper surface of the patient's mouth and allowed to harden forming an impression of the upper surface, to be engaged by a denture. Two spirit levels 14 and 16 positioned with their axes at right angles are supported on the handle 12 by a spherical member 18 surrounded by a flexible band 20 for securing the levels in fixed position. When the impression is set and preferably while the patient's head is held in an erect position the levels are adjusted until the bubbles therein are centrally located. The levels are then secured in place by tightening a wing nut 22 engaging the ends of the flexible band. The tray with the impression of the upper surface is then removed from the patient's mouth.

The plaster model is then made by pouring soft plaster into the impression. When the plaster is set the tray is secured to a support 24 mounted on a frame 26 adjustably secured to the back plate 28 of the articulator by a knurled nut 30. The frame 26 is moved vertically and the support 24 is moved transversely along the frame until suitably positioned to locate the model in the articulator. The frame and support are then secured in place by tightening nut 30 on the frame and set screw 32 on the support. The tray is then placed with the handle 12 in the slot 33 in the support 24 and adjusted until the levels 14 and 16 on the handle of the tray are accurately levelled. The tray with the upper model carried thereby is fixed in position by tightening a flexible band 34 about a spherical member 36 by means of the wing nut 38.

When the tray and the model are so positioned the lower surface of the upper model is in exactly the same position as was the upper surface of the patient's mouth when the impression was taken. An upper holding member 40 movably mounted on the articulator carries a mounting plate 41 held in place by a securing nut 43. The mounting plate is then moved into a position adjacent the upper face of the model and the model is secured thereto by plaster or otherwise. The impression and tray are then removed from the model in the customary way, as by detaching mounting plate from the holding member 40 of the articulator. An upper bite plate is now made from the model in the usual way after which the mounting plate with model 6 can be replaced on the holding member of the articulator in their original position preparatory to adjusting the articulator.

An alternative method for locating the model in the articulator comprises the steps of forming the model and bite plate in any conventional way, securing a fork 42 such as shown in Fig. 3 to the bite plate and placing the bite plate against the upper surface of the patient's mouth. Levels 44 and 46 carried by the fork are then adjusted as when the tray and impression are used until the bubbles are centrally located. The fork and bite plate are then placed on the support 24 of the articulator and accurately levelled, just as the tray is levelled when used, after which the model is placed in contact with the bite plate and the mounting plate 41 on the holding member 40 of the articulator is moved into position for securing the model thereto with plaster or otherwise.

When using either of the foregoing methods the model is located in the articulator in exactly the same position as was the upper surface of the patient's mouth when the levels on the tray or the fork was first adjusted.

Having located the upper model in the articulator the operator next makes a record of the patient's mandibular movements. In order to make a record of the patient's mandibular movements the lower bite plate is formed from the lower model 8 and members forming elements of an optical system are secured to the bite plates 2 and 4. Preferably the upper bite plate supports a screen 50 and a source of light 52 while the lower bite plate supports mirrors 54, 56 and 58 for reflecting light from the source 52 onto the screen 50.

As illustrated a member 60 is provided for supporting the screen 50. The member 60 has an extended flat surface 62 which when properly positioned is located beneath the central portion of the upper bite plate as shown in Fig. 1. The member 60 also is provided with an arm 64 which extends forward and upward from the bite plate into a position to support a screen frame 66 by which the screen 50 is carried. In order to locate the surface 62 on the member 60 in a position on the upper bite plate 2 which will be exactly level when the bite plate is in engagement with the upper model the member 60 is first secured to the support 24 on the frame 26 on the articulator. The surface 62 then is located in a level position by placing levels thereon and adjusting the support until the bubbles therein are centrally located as in the previous adjustment of the bite plate or tray. The upper bite plate is then placed in position on the upper model and the lower exposed surface of the bite plate softened or soft material applied thereto. The upper model and bite plate are then moved downward with the upper member of the articulator until the softened material engages the upper face of the surface 62. The material is allowed to harden and the member 60 released from support 24 so that it is carried by the upper bite plate and presents a lower exposed surface 62 which is in a level position when the bite plate engages the upper model.

Figure 6:
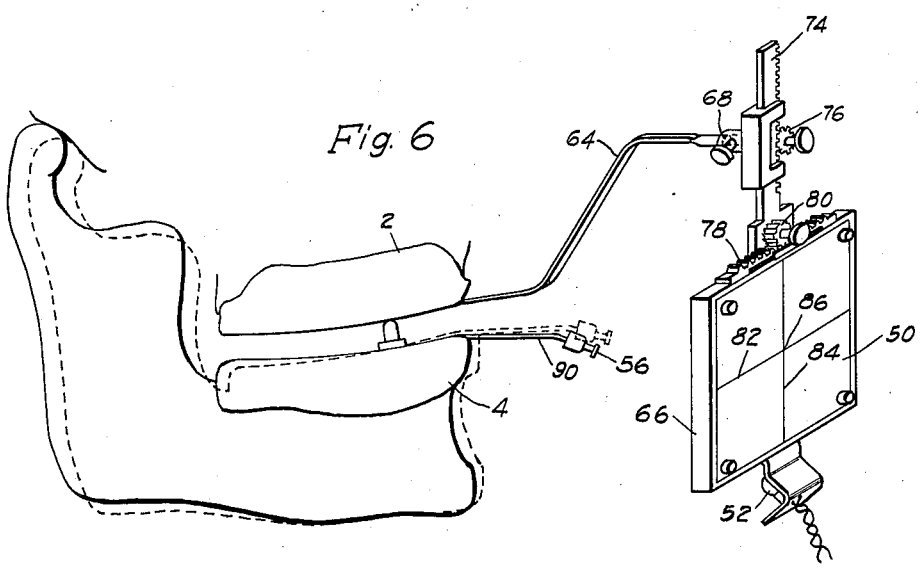
Fig. 6 is a diagrammatic illustration of the elements of Figs. 1 and 2 as used in producing a record.

The screen 50 is removably positioned on a screen frame 66 supported by a head 68 secured to the end of the arm 64 of the member 60. As shown in Fig. 1 the head 68 may receive a vertically extending bar 72 adjustably secured to the head by a set screw 73. However, we prefer to employ a construction as shown in Fig. 6 in which the head 68 is formed to receive a rack 74 secured to the frame 66 and the pinion 76, carried by the head, serves for adjusting the screen vertically with respect to the head and upper bite plate. The screen frame also is provided with a rack 78 cooperating with pinion 80 for making horizontal adjustments to the screen with reference to the head and supporting arm.

Figure 7:
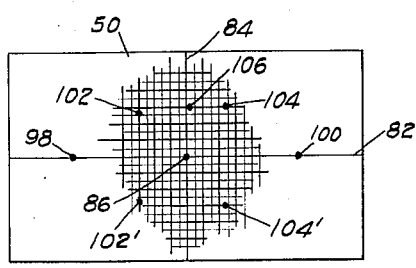
Fig. 7 is an illustration of a typical form of record produced in accordance with our invention.

The screen 50 which preferably is in the form of a removable record sheet of paper or the like may be suitably laid out to identify the location of points thereon. As shown in Fig. 7 the screen is provided with vertical and horizontal lines similar to those on ordinary graph paper with a horizontal axis 82 and a vertical axis 84 intersecting at the point 86. The horizontal axis 82 may be positioned by suitable means so that it is exactly parallel to the plane of the surface 62 on the member 60. This may be accomplished in any desired way as by forming the head 68 and screen frame 66 so that when the head is secured in place with the bar 72 or rack 74 carried thereby, the frame is so positioned that the horizontal axis 82 on screen 50 lies in a plane parallel to the surface 62. The distance of the horizontal axis 82 from the plane of surface 62 may be adjusted by movement of the screen vertically through the operation of the rack 74 and pinion 76 and the location of the vertical axis 84 and the point 86 where the vertical and horizontal axes cross may be adjusted horizontally by the rack 78 and pinion 80 until the screen is in the desired location.

The mirrors 54, 56 and 58 used in producing a record of the patient's mandibular movements on the screen 50 are carried by member 88 fixed to the lower bite plate 4. The member 88 has a portion 90 projecting therefrom to which the mirrors are adjustably secured by a set screw 91 or otherwise. The member 88 may be secured to the lower bite plate in any suitable position but for convenience in operation we prefer to secure the member 88 to the lower bite place in a position which is at least approximately parallel to the surface 62. This may be accomplished by attaching member 88 to the member 60 on the upper bite plate by a screw or other means passed through openings 92 in the projecting portions of the members. The material on the upper surfaces of the lower bite plate is then softened and with both bite plates in position in the patient's mouth and the member 88 carried by member 60 the member 88 is pressed against the upper surface of the lower bite plate to make an indentation therein. The bite plates are then separated by removing the screw from openings 92 and the member 88 is positioned in the indentation formed in the lower bite plate and is secured in place by plastic material or the like. If desired either or both of the members 60 and 88 may be formed with an arcuate opening indicated at 93 on the member 88 so that partial dentures may be produced and the patient's natural teeth may project through the opening 93.

A pin 94 is secured to a portion of the member 88 in position to engage the level surface 62 on the supporting member 60 and is adjusted vertically, so that when in engagement with the surface 62 the upper and lower bite plates will be spaced apart the desired distance corresponding to the height of the teeth required to provide the desired "bite opening" and the best appearance of the dentures.

The pin 94 is located in a position at approximately the center of the lower bite plate, that is, at a point which is located on the center line of the bite plate and spaced as nearly as possible equally distant from all points on the surface to be engaged by the dentures. When the pin 94 is in this position and engages with the surface 62 on the member 60 the force exerted on the bite plates is applied centrally thereto and therefore is no greater on one side or at one point on the surfaces engaged than it is another. Thus the pressure is distributed uniformly over the surfaces to be engaged by the dentures and injury to the tissue engaged by the dentures will be avoided.

The mirrors, 54, 56 and 58 preferably are located side by side on a support 55 with the mirror 56 positioned between mirrors 54, and 58 but they may be individually adjustable if desired. A source of light 52 is carried by the screen frame 66 or is otherwise supported in fixed position with reference thereto to cause light passing from the source 52 and falling on the mirrors 54, 56 and 58 to be reflected onto the screen 50. The mirrors employed preferably are of such size and shape as to produce a reflection in the form of a single small spot of light from each mirror. When the pin 94 is in engagement with the surface 62 the mirrors and light are adjusted or the screen 50 is moved until the reflection of light from the central mirror 56 falls on the point 86 where the vertical and horizontal axes cross. The lateral mirrors 54 and 58 are adjusted by loosening set screw 91 and rotating the mirror support 55 until the reflection 98 and 100, therefrom, fall on the horizontal axis 82, when the pin 94 is in engagement with the surface 62.

The apparatus is then ready for producing a record of the patient's mandibular movement. The patient is required to move his lower jaw laterally and forward until accustomed to make such movements freely and naturally. When this movement has been acquired and the mandible is in position with the reflection from the central mirror coinciding with the point 86 and the lateral reflections 98 and 100 located on the horizontal axis 82, a record is made of the position of the reflections 98 and 100. The patient then moves his mandible to the right and bite plate 4 moves to the right with the mandible while pin 94 moves over the surface 62. Upon movement of the mandible, bite plate and mirrors to the right the reflection of light from the central mirror 56 moves to the left, as viewed by an operator facing the patient and as shown in Fig. 7. Thus the reflection may move from the intersection 86 to some point such as 102 on the screen. This new position 102 is noted either by marking on the screen or by making a notation of the abscissa and ordinates of the point 102 on the graph of the record sheet 50.

The patient then moves his mandible to the left and the pin 94 is moved therewith, whereby the reflection of light from the central mirror 56 moves to the right as shown in Fig. 7 to a position such as 104, which is marked on the screen or noted by reference to its abscissa and ordinates. The patient then moves his mandible to the position of protrusion and the pin 94 moves forward over the surface 62 and the reflection of light from the central mirror moves to a point such as 106 which is noted on the record sheet.

While for greatest accuracy a whole series of points may be noted in the travel of the reflection of light from the central mirror to the various points 102, 104 and 106 and the movement of the reflections from each of the mirrors 54, 56 and 58 may be recorded, we have found in practice that it is seldom necessary to note other points than those indicated above. When the record has been made the upper and lower bite plates with the supporting members thereon may be removed and the patient excused.

In making records as described the movements of the mandible are as follows:

On movement of the mandible to the right position corresponding to the point 102 on the left side of the screen, the patient's left condyle moves forward and usually downward in its fossa while the right condyle remains in its rearward position. The mandible, therefore, moves in a forward and downwardly extending arc about the right condyle as a pivot while the pin 94 moves from the position A of Fig. 8 to the position B. During this movement of the mandible the bite plate carried by the mandible moves from the position $A^1$, $A^2$ to the tilted position $B^1$, $B^2$ of Fig. 8.

Figure 8:
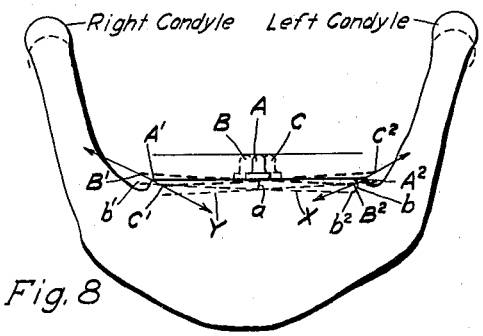
Fig. 8 is a diagrammatic front view of a patient's jaws indicating characteristic movements thereof.

Similarly when the mandible moves to the left as indicated by the point 104 on the right side of the screen the patient's right condyle moves forward and usually downward, while the left condyle acts as a pivot and the pin 94 moves to the position C of Fig. 8. The bite plate 4 then moves from the position $A^1$, $A^2$ to the oppositely tilted position $C^1$, $C^2$. In moving to the position of protrusion indicated by the point 106 both condyles move forward in their fossas, the pin 94 moves forward on surface 62 and the bite plate 4 tilts or is moved in accordance with the characteristics of the patient's fossas. While the movements of the condyles on lateral and protrusive movements of the mandible are ordinarily downward, the movements of the mirror 56 and the reflection therefrom on the screen is upward from the horizontal axis 82 because the pin 94 is located between the condyle and the mirror and acts as a pivot about which the mandible and the base plate tilt in their movements as shown in Fig. 6. Upward movements of the reflections on the screen therefore are indications of corresponding, but not necessarily similar, downward movements of the condyles in their fossas.

The lower model 8 may be located in the articulator in any suitable way so that it is in a position which corresponds to the position of the patient's mandible with respect to his maxilla, when the record was made. This may be accomplished by means of the ordinary "wax bite" heretofore used in dentistry. Preferably, however, we use the record obtained, as described above, for positioning the lower model. This may be accomplished by placing the upper bite plate carrying the screen in position on the upper model fixed to the upper holding member 40 of the articulator. The lower bite plate carrying the member 88 with the mirrors thereon, is then secured to the support 24 on frame 26 of the articulator and is positioned with the pin 94 on the member 88 in engagement with the surface 62 on the screen supporting member 60. The position of the lower bite plate and member 88 is then adjusted until the reflection from the central mirror 56 falls on the point 86 at the intersection of the vertical and horizontal axis, and the positions of the reflections 98 and 100 from the lateral mirrors 54 and 58 fall accurately into the locations noted on the record sheet, in which they fell when the bite plates were in the patient's mouth preparatory to producing the record of mandibular movements. When the lower bite plate is so positioned, it is secured in place. The lower model 8 is then positioned in engagement with the lower bite plate 4 and is secured to a mounting plate on the lower holding member 110 of the articulator by means of plaster or the like. In this way the lower model is positioned with respect to the upper model in exactly the same location as were the surfaces in the patient's mouth which are to be engaged by the artificial dentures at the time when the record was made. The articulator may then be adjusted to faithfully reproduce the patient's mandibular movement.

In order to adjust the members 112 and 114 of the articulator which correspond to the patient's right and left condyles and fossas respectively, the bite plates 2 and 4 with the members 60 and 88 carried thereby are placed in engagement with the models 6 and 8 respectively and the pin 94 is placed in engagement with the surface 62 on the member 60. The reflection of light from the central mirror 56 will then fall on the point 86 at the intersection of the horizontal and vertical axes on the screen. The lower member 110 of the articulator with the model 8, base plate 4 and mirror 56 is then moved from side to side and the artificial condyles 112 and 114 are adjusted until upon lateral and protrusive movements of the lower member the reflection of light from mirror 56 falls exactly on the points 102, 104 and 106 on the screen 50.

When so adjusted the condyles 112 and 114 of the articulator are secured in position by retaining means 115 and the operator is then assured that the movements of the member 110 and of the model 8 are identical with those movements of the patient's mandible which took place in making the record produced.

In producing the record as described above and in adjusting the condyles of the articulator and the pin 94 travels over the level surface 62 and no consideration is given to the characteristics of mandibular movements as influenced by the cusps of the patient's teeth. However, if the dentures are to provide balanced occlusion and uniform distribution of the forces applied to the dentures the cusps of the teeth should be considered and they should be so related to the mandibular movements as influenced by the patient's condyles and fossas as to be complementary thereto.

As illustrated in Fig. 6 the lateral movements of the patient's mandible cause the rear portion thereof and the rear of the bite plate 4 to move downward and the mirror and front portion of the bite plate to move upward. Further as illustrated in Fig. 8 these movements also cause the mandible and bite plate to tilt moving one side of the bite plate downward and the other side upward.

If the teeth provided on dentures corresponding to the bite plates 2 and 4 had no cusps and were in engagement on all sides when the bite plates are in the occlusal position $A^1$, $A^2$ of Fig. 8 it is evident that on lateral movement to a position corresponding to $B^1$ $B^2$ of the bite plates, the dentures would be in contact only on the side $B^1$ while on the side $B^2$ the dentures would be spaced apart. The spacing of the side $B^2$ of the lower denture from the surface $A^1$ $A^2$ of the upper denture in this case would be the distance $b$ as indicated by drawing a line X from a point $b^1$ on suface $A^1$ $A^2$ extended and directly below the point $B^1$ and parallel to $B^1$ $B^2$ to a point $b^2$ below point $B^2$. Similarly the front teeth would be spaced apart a distance $a$ and the other teeth would be spaced apart correspondingly different distances. Such a condition would of course produce malocclusion. However, if the cusps on the teeth of the dentures are of such height as to occupy the intervening spaces $b$ and $a$ and are so inclined that on lateral displacement of the mandible to the position of line X the cusps of teeth on both sides and in the front of the denture remain in contact throughout their movement from position $A^1$ $A^2$ to position X a condition of balanced occlusion will be provided. The pressure of the dentures on the surfaces they engage will then be distributed uniformly. In a similar way the cusps of the teeth should also engage on movement of the mandible in the opposite direction from the position $A^1$ $A^2$ to the position Y.

The inclinations of the cusps required to obtain such balanced occlusion are directly related to the inclinations of the condyle and fossa. However, as seen by reference to Fig. 8 the mandible and lower bite plate move downward when moved to either lateral position and the amount and direction of movement is indicated by the record previously produced. In other words, the record obtained is an inverted record of the inclinations of the cusps of the teeth which should be used in constructing dentures and is a record which may be used in adjusting the incisive guide of the articulator in setting up and grinding the cusps of the teeth required to produce balanced occlusion. In order make such adjustments of the articulator the record sheet 50 is laid off by projecting the points 102' and 104' downwardly below the horizontal axis to the corresponding points 102' and 104' which lie in the same positions with respect to the vertical and horizontal axes but below the horizontal axis rather than above the same.

When these points have been located the incisive guide of the articulator indicated at 116 is adjusted until the reflection of light from the central mirror falls accurately into the points 102' and 104' when the lower member is moved laterally. The incisive guide shown comprises a pin 118 carried by the lower member 110 of the articulator and engaging adjustable wings 120 and 122 on the incisive guide. The wings are raised and lowered by means of gears 124 which mesh with gear segments 126 attached to the wings and are rotated by manipulating knurled handles 128 projecting forwardly from the gears.

In some instances it may also be desired to tilt the incisive guide forward to produce cusps which are deeper than indicated by the record but which are properly related to the record. In such cases the incisive guide may also be provided with a gear 130 adjustable by rotation of handle 132 for tilting the incisive guide bodily forward and backward.

The incisive guide preferably is provided with arcuate scales 134 graduated in degrees or otherwise and located adjacent the wings of the articulator. When properly adjusted the inclinations of the wings of the condyle may be read on the scales and the cusp inclinations of the teeth to be used is thereby indicated in terms of degrees of graduations on the scales.

When the articulator is adjusted as described the bite plates may be removed and the dentist may proceed with the construction of the dentures. When the teeth have been set up and ground in as controlled by the artificial condyles and the incisive guide of the articulator the dentures will possess the characteristics of balanced occlusion throughout all movements of the mandible and will not bear against the tissues which they engage with greater force at one point or on one side than at another point or on the other side. The resulting dentures therefore will function in exactly the same manner as would natural teeth, without cusp interference and without strain on the fossas or uneven and painful pressure on the tissues which are engaged by the dentures.

Figure 9:
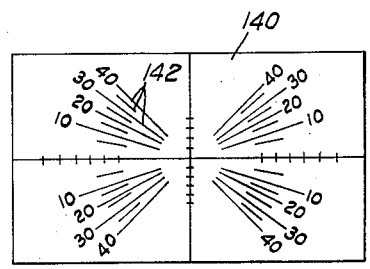
Fig. 9 is an illustration of an alternative form of record adapted for use in the practice of our invention.

As illustrated in Fig. 9 the screen 140 may be marked off with radially extending lines 142 instead of in a graph as previously described. A screen of this type has the advantage of being readable directly in terms of degrees or graduations on the artificial condyles and incisive guide of the articulator. For instance in making a record of the patient's mandibular movements the operator only need observe that the reflection of light from the central mirror falls on the line 30 for instance on movement of the mandible to the right and on line 40 for instance when the mandible is moved to the left. The height of the reflection on protrusive movement may then be noted. The operator then adjusts the left artificial condyle to an inclination corresponding to line 30 and adjusts the right wing of the incisive guide to an inclination corresponding to line 30 while the right artificial condyle and left wing of the incisive guide are adjusted to positions corresponding to line 40. All of the adjustments of the articulator may thus be taken directly from the record without even checking the recorded movements.

This greatly simplifies the dentist's operations and enables him to be assured that the operator who sets up and grinds in the teeth will be able to construct the dentures easily and with great accuracy without even seeing the record produced.

In some instances it may be desirable to simplify the operation described above and to perform the leveling of the surface 62 of the member 60 and to make the registration in a single operation so that the patient does not have to return to the dentist's office a number of times.

In such cases a modified form of screen supporting member such as that illustrated in Fig. 10 may be used, this construction embodies an upper member 150 having a single spherical bearing 152 about which a lower member 154 is movable. A flexible band 156 carried by the lower member may be tightened about the spherical bearing by means of a wing nut 158 to secure the lower member in a fixed position with respect to the upper member. The lower member also is provided with a forwardly and upwardly extending arm 160 by which the screen may be carried, the lower surface 162 of the lower member 154 may be located in a level position by means of spirit levels 164 and 166 fixed to the arm 160.

In using this construction plastic material may be placed on the upper surface of the upper member 150 and pressed against the upper surface of the patient's mouth to form an impression in the plastic compound. Thereafter the lower member 154 may be adjusted with respect to the upper member 150 until the lower surface 162 of the member 154 is perfectly level as indicated by the centering of the bubbles in the spirit levels 164 and 166. The flexible band 156 is then tightened about the bearing 152 by means of the wing nut 158 so that it will be held in fixed position with respect to the upper member 150.

A lower bite plate carrying the member 88 and mirrors 54, 56 and 58 may then be made and located in the patient's mouth and against the lower surface to be engaged by a denture. The pin 94 on the member 88 may then be adjusted to the desired bite opening and the record made as described above. If desired other impressions can be made for producing the models and the patient may then be excused.

The operator after having obtained the patient's record may, if the upper model is not previously made pour plaster directly into the impression in the material on member 150 to produce the model. In any case whether the model is made separately or is formed in the impression on member 150, the operator locates the member 154 on the support 24 on frame 26 carried by the articulator. When properly leveled the member 154 is secured in place. If the model is carried by the member 150 it is then in position for attachment to the articulator or if made separately a model of the upper surface of the patient's mouth is placed in the impression in the plastic material on the upper member 150. Then the holding member 40 of the articulator and the mounting plate 41 are moved into position adjacent the upper surface of the upper model and the model is secured to the mounting plate by means of plaster or otherwise. Thereafter the lower model may be positioned in the articulator by means of the record as described and the articulator may be adjusted for grinding in the teeth of the dentures. Thus the operations are simplified still further without sacrifice in the accuracy of the process.

From the foregoing description of our invention it will be evident that the means illustrated and described above for obtaining the desired records and for use in producing dentures may be varied considerably in design and construction and that numerous modifications may be made in the method of locating the models in the articulator and in setting up and grinding the teeth in any particular case. It will also be evident that while the articulator referred to above is provided with a fixed member, the invention may be employed when using articulators in which the lower member is fixed and the upper member is movable. In view thereof, it should be understood that the forms of apparatus and methods of procedure herein described and shown are intended to be illustrative of our invention and are not intended to limit the scope thereof.

We claim as our invention:

1. Apparatus for use in dentistry comprising members adapted to be supported by a patient's mandible and maxilla, a screen carried by one of said members, a source of light located in fixed position with respect to said screen and a mirror secured to the other of said members and positioned to cause a reflection of light from said source to fall on said screen.

2. Apparatus for use in dentistry comprising a screen, means for supporting said screen, said means also being adapted to support material having an impression therein, a source of light located in fixed position with reference to said screen, a mirror, and means adapted to be positioned in a patient's mouth for positioning said mirror to reflect light from said source onto said screen.

3. Apparatus for use in dentistry having in combination members adapted to be fixed to upper and lower bite plates and an optical system including a source of light, a screen carried by one of said members and a mirror carried by the other of said members and positioned to reflect light from said source onto said screen.

4. Apparatus for use in dentistry having in combination members adapted to be fixed to upper and lower bite plates, an optical system including a source of light, a screen carried by one of said members and a mirror carried by the other of said members and positioned to reflect light from said source onto said screen and means for moving said screen with respect to the member by which it is carried.

5. Apparatus for use in dentistry having in combination members adapted to be fixed to upper and lower bite plates, an optical system including a source of light and a screen carried by one of said members and a mirror carried by the other of said members and positioned to reflect light from said source onto said screen, said screen having an index thereon and means for indicating the location of the reflection of light thereon with respect to said index.

6. In combination with a member for attachment to a bite plate, means for moving a reflection of light in a path corresponding to the movement of said bite plate when located in a patient's mouth, said means comprising a mirror carried by said member, a source of light directed onto said mirror and a screen positioned to receive a reflection of light passing from said source to said mirror.

7. Apparatus for use in dentistry having in combination an optical system including a source of light, a mirror and a screen arranged to cause light from said source to be reflected by said mirror onto said screen, members carrying the elements of said optical system adapted to be secured to bite plates and means for indicating the location of bite plates secured to said members with respect to surfaces engageable by said bite plates.

8. A method for producing a record of a patient's mandibular movements by means of bite plates, and an optical system including a source of light, a mirror and a screen, comprising the steps of securing the light and screen to one of the bite plates, securing the mirror to the other bite plate and recording the location of a reflection of light from said source and falling on said screen when the patient's mandible is moved to various occlusal positions.

JAMES S. MILLER.
CARL RICHARD WALLER.